No. 751,792. Patented February 9, 1904.

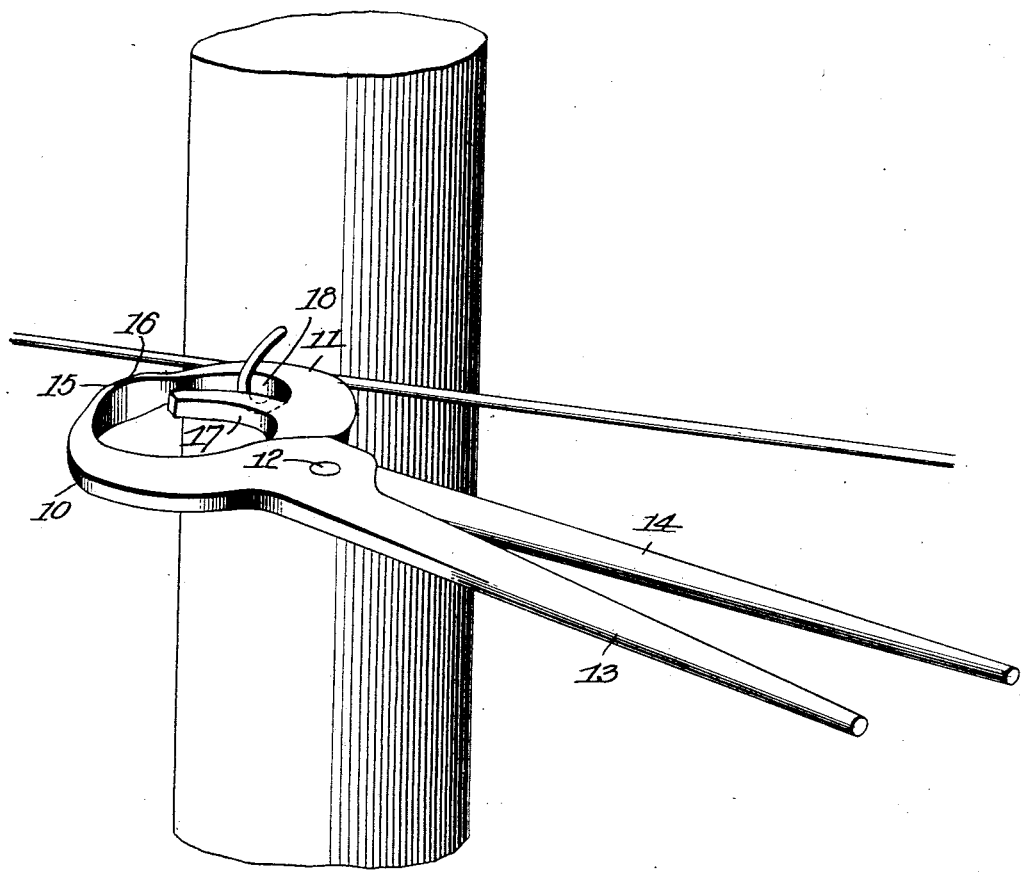

UNITED STATES PATENT OFFICE.

OZIAS C. HEALY, OF MAPLETON, MINNESOTA.

STAPLE-EXTRACTOR.

SPECIFICATION forming part of Letters Patent No. 751,792, dated February 9, 1904.

Application filed August 13, 1903. Serial No. 169,384. (No model.)

*To all whom it may concern:*

Be it known that I, OZIAS C. HEALY, a citizen of the United States, residing at Mapleton, in the county of Blue Earth and State of Minnesota, have invented a new and useful Staple-Extractor, of which the following is a specification.

This invention relates to devices employed for extracting the staples of wire fences, and has for its object to produce a simply-constructed and easily-operated implement whereby the staples may be withdrawn and supported until removed from the implement and deposited in a suitable receptacle; and the invention consists in certain novel features of construction, as hereinafter shown and described, and specified in the claims.

In the drawing illustrative of the invention, in which corresponding parts are denoted by like designating characters, the figure is a perspective view of the improved implement applied.

The staples employed for securing the wires to fence-posts are capable of repeated use, and when fences of this character are to be repaired or removed an implement which will extract the staples and hold them until they can be detached and placed in a suitable receptacle is very desirable and valuable, and an implement constructed to accomplish this result is herein shown and described, consisting of two oppositely-curving jaw members 10 11, pivotally united at 12 and extending into operating-handles 13 14, as shown.

The free or operating ends 15 16 of the jaw members are "chisel" or wedge shaped and preferably extended laterally, as shown, and form an effective implement whereby the staples may be withdrawn, as will be obvious. The chisel form of the terminals 15 16, it will be understood, provides a ready means for enabling the operator to force the jaw members into the wood of the posts and beneath the staples and then employ the handle member 14 as a pry or lever to withdraw the staple, this action causing the outer portion or loop of the staple to hang upon the jaw member 11, as indicated.

To prevent the staple thus withdrawn from falling from the implement, the jaw member 11 is provided with a tongue 17, extending from a point near the pivot 12 and terminating adjacent to the terminal 16, with the space 18 between the parts 11 and 17 enlarged somewhat, as shown. By this simple arrangement as the jaw member 11 is forced beneath the staple in the act of withdrawing it the latter will pass into the space 18 and be prevented by the tongue 17 from falling from the implement and be held thereby until removed by the operator. By this simple means the staples will be preserved and retained by the implement in position to be deposited in a suitable receptacle and preserved for further use.

The implement will be of steel, with the wearing-surfaces properly tempered to enable them to resist the strains to which they will be subjected and of proper size to accomplish the desired results.

The implement is very simple in construction, easily applied and operated, and will effectually accomplish the work required.

Having thus described the invention, what I claim is—

1. A staple-extractor comprising two opposing reversely-curved jaw members pivotally united, one of said jaw members having a tongue arranged longitudinally thereof in the space between the jaw members and spaced therefrom with its free end terminating adjacent the free end of the jaw members with which it is connected.

2. A staple-extractor comprising reversely-curved opposing jaw members pivotally united at their rear ends and terminating in wedge-shaped free ends, one of said jaw members having a tongue secured to its inner face near its rear end and extending longitudinally thereof to receive and support a staple after its withdrawal.

3. The improved implement herein described comprising opposing jaw members pivotally united at their rear ends and extending into handles and oppositely curved and terminating in wedge-shaped free ends, one of said jaw members having a tongue projecting inwardly therefrom and terminating adjacent to the inner sides of said wedge-shaped free ends with the space between the tongue and jaw member increasing in area toward the root of the tongue, substantially as specified.

In testimony that I claim the foregoing as my own I have hereto affixed my signature in the presence of two witnesses.

OZIAS C. HEALY.

Witnesses:
    HATTIE WILDE,
    A. J. HEALY.